United States Patent
Brangoulo et al.

(10) Patent No.: US 8,933,783 B2
(45) Date of Patent: Jan. 13, 2015

(54) DETECTION OF FRAUD FOR ACCESS CONTROL SYSTEM OF BIOMETRIC TYPE

(75) Inventors: Sébastien Brangoulo, Issy les Moulineaux (FR); Thomas Fedusac, Issy les Moulineaux (FR)

(73) Assignee: Morpho, Issy-les-Moulineaux (FR)

( * ) Notice: Subject to any disclaimer, the term of this patent is extended or adjusted under 35 U.S.C. 154(b) by 0 days.

(21) Appl. No.: 14/342,358

(22) PCT Filed: Aug. 30, 2012

(86) PCT No.: PCT/EP2012/066919
§ 371 (c)(1),
(2), (4) Date: May 30, 2014

(87) PCT Pub. No.: WO2013/030309
PCT Pub. Date: Mar. 7, 2013

(65) Prior Publication Data
US 2014/0292480 A1    Oct. 2, 2014

(51) Int. Cl.
*G07C 9/00* (2006.01)
*G06K 9/00* (2006.01)

(52) U.S. Cl.
CPC ........ *G07C 9/00158* (2013.01); *G06K 9/00221* (2013.01); *G06K 9/00899* (2013.01)
USPC .......... 340/5.83; 340/5.53; 382/115; 382/118

(58) Field of Classification Search
CPC .......... G06K 9/00221; G06K 9/00228; G06K 9/00268; G06K 9/00201; G06K 9/00208
USPC ........ 340/5.1, 5.2, 5.51, 5.52, 5.53, 5.8, 5.81, 340/5.82, 5.83; 382/115, 118
See application file for complete search history.

(56) References Cited

U.S. PATENT DOCUMENTS 7,242,807 B2 *  7/2007  Waupotitsch et al. ........ 382/209

FOREIGN PATENT DOCUMENTS

EP        1 703 440 A2     9/2006

OTHER PUBLICATIONS

Qi Li et al. "A Binocular Framework for Face Liveness Verification under Unconstrained Localization." 2010 Ninth International Conference on Machine Learning and Applications. IEEE Computer Society (2010). 4 pages.
Choudhury et al. "Multimodal Person Recognition using Unconstrained Audio and Video." Proc. 2nd Conf. Audio and Video-based Biometric Person Authentication (Jan. 1, 1999). 6 pages. http://www.cs.columbia.edu/~jebara/papers/TR-472.pdf.

(Continued)

*Primary Examiner* — Andrew Bee
(74) *Attorney, Agent, or Firm* — Blakely Sokoloff Taylor & Zafman (57) ABSTRACT

The invention relates to a method of detecting fraud for an access control system using biometric recognition, comprising the steps consisting in: taking at least two images (S2) of a face presented to the access control system by an individual (I) according to at least two positions of the individual in front of the access control system, or two angles of picture-taking of the individual, processing these two images to determine a score representative of the flatness of the face appearing on the images, and as a function of this flatness score, detecting a possible fraud on the part of the individual, said detection conditioning the implementation of an identification processing of the individual by the access control system. The invention also relates to an access control system implementing said method.

4 Claims, 4 Drawing Sheets

(56) References Cited

OTHER PUBLICATIONS

Egnal et al. "Detecting Binocular Half-Occlusions: Empircal Comparisons of Five Approaches." IEEE Transactions on Pattern Analysis and Machine Intelligence, vol. 24 No. 8. IEE Service Center, Los Alamitos CA (Aug. 1, 2002). 6 pages.

Li, Q., et al., "A Binocular Framework for Face Liveness Verification Under Unconstrained Localization," *2010 Ninth International Conference on Machine Learning and Applications, IEEE*, Dec. 12, 2010, XP031900773, pp. 204-207.

Choudhury, T., et al., "Multimodal Person Recognition Using Unconstrained Audio and Video," *Proc. 2nd Conf. Audio- and Video-Based Biometric Person Authentication*, Jan. 1, 1999, XP055024267, pp. 1-6.

Egnal, G., et al., "Detecting Binocular Half-Occlusions: Empirical Comparisons of Five Approaches," *IEEE Transactions on Pattern Analysis and Machine Intelligence*, vol. 24, No. 8, Aug. 2002, XP011094700, pp. 1127-1133.

\* cited by examiner

DETECTION OF FRAUD FOR ACCESS CONTROL SYSTEM OF BIOMETRIC TYPE

FIELD OF THE INVENTION

The present invention generally relates to the field of biometric recognition and access control systems.

It proposes in particular a process and a fraud-detection system for access control system, especially of the type using recognition processing on face images (facial recognition).

STATE OF THE ART

Facial recognition is currently used by access control systems and most times is used by comparing an image of an individual presenting to the control system to an identity image of the individual featured in a database or on a secure document carried by the individual.

However, current access control systems via facial recognition are made to fail by different types of fraud, the most widespread known as « leading edge ».

For an individual, this type of attack consists of presenting the access control system with a face—or a representation of a face—of another person whose access is authorised.

To do this, the individual generally presents a support in two dimensions, which most often masks his face, and on which is printed a photograph of the face of another person.

Such media can be paper (a simple printed photograph), cloth (wearing clothing featuring good-quality printing), or it can even be digital media such as for example digital tablets to which an individual uploads a photo.

In these cases, the access control system executes the identification process from the photograph and authorises access of the individual, in the process not detecting any fraud.

Also, facial recognition methods can also produce errors even if the individual is not trying to commit fraud. For example, an individual authorised to enter the premises, but wearing clothing on which a good-quality photograph is printed, can be barred access to the premises if the photograph is taken for identification.

Solutions have been proposed for correcting these errors and detecting this type of attack.

Solutions for distinguishing a real face from a photograph by detecting eye blinking are known for example. Such solutions are developed for example in the document « Eyeblink-based Anti-Spoofing in Face Recognition from a GenericWebcamera » (G. Pan, L. Sun, Z. Wu, S. Lao, iccv, pp. 1-8, 2007 IEEE 11th International Conference on Computer Vision, 2007) and in the document « Real-time eye blink detection with GPU-based SIFT tracking » (Lalonde, M., Byrns, D.; Gagnon, L.; Teasdale, N., Laurendeau, D., Canadian Conference on Computer and Robot Vision—CRV, pp. 481-487, 2007).

However, these solutions are not always effective, since in some cases the photograph must be taken during a given time lapse, or at a given position of the individual. Eye blinking, necessary for this method, is therefore statistically not guaranteed, all the more so since people tend to prevent eye blinking when a photograph is taken.

An alternative method by measuring radiance from the face taken in a photograph has also been proposed in the document « Masked fake face detection using radiance measurements » (Y. Kim, J. Na, S. Yoon, J. Yi, J. Opt. Soc. Am. A/Vol. 26, No. 4/April 2009), but this method depends on media material used in the event of fraud, and is therefore not very reliable.

Finally, a method via spectral analysis of the image can also fail in the event of fraud if the photograph used for the fraud is of sufficiently good quality.

PRESENTATION OF THE INVENTION

As a consequence, one of the aims of the present invention is to propose a solution for detecting this type of fraud more reliably than the prior art.

Another aim of the present invention is to propose a solution which is more robust also for fraud of « semi-plane » type, wherein the face image presented by an individual is curved to simulate the volume of a face.

In this respect, the invention proposes a method of fraud detection for access control system via biometric recognition, comprising the steps consisting of:
- taking at least two images of a face presented to the access control system by an individual according to at least two positions of the individual in front of the access control system, or two angles of vision of the individual
- processing these two images to determine a score representative of the flatness of the face appearing on the images, and
- as a function of this flatness score detecting any fraud on the part of the individual, said detection conditioning the use of identification treatment of the individual by the access control system.

The method of facial recognition proposed by the invention can also comprise at least one of the following characteristics:
- it can consist of determining from the images a depth map of at least part of the face of the individual and processing this depth map to deduce therefrom the flatness score.
- in this case, it also comprises a standardisation step of the depth map so that it is independent of the angles of vision of the images of the face of the individual.
- the method consists of estimating a median plane of the depth map of the face of the individual, then calculating the variance of the points of the depth map relative to said median plane, the variance forming the flatness score.
- the method by estimation of the variance of a depth map is conducted on a block centred on the nose of the individual,
- the method consists of determining a flatness scores from flatness scores obtained by calculation of the variance of a depth map of several parts of the face,
- the flatness score of the face of the individual is calculated by conducting the following steps:
  - on the two images used for evaluation of the flatness of the face detecting points of interest of the face of the individual,
  - from the number of points of interest of the face common to the two images, determining a flatness score.
- the flatness score is calculated in particular by dividing the number of points of interest common to the two images by a number selected from the following group: average number of points of interest in the two images, minimum or maximum number of points of interest between the two images.
- the flatness score of the face of the individual is evaluated by conducting the steps consisting of:
  - on the two images used for evaluation of the flatness of the face detecting points of interest of the face of the individual,
  - determining transformation parameters from the points of interests detected, applying transformation to one of the two images,
determining points of interests of the two images,
registering the points of interests of the two images, and
from the measurements of disparities between the points of interest determining a flatness score of the face.

the transformation carried out on one of the two images is refined or quadratic transformation.

the determination of the flatness score is done from at least one of the flatness scores obtained by executing the alternatives described hereinabove.

The invention also relates to an access control system via biometric recognition adapted to use the method for fraud detection, and comprising:

one or more acquisition systems adapted to capture at least two images of the face presented by an individual according to at least two positions or viewing angles of the individual relative to the acquisition system, and a calculation platform, to which are sent images by the acquisition system, the calculation platform being adapted to process these two images to determine a score representative of the flatness of the face appearing on the images, and from this evaluation detecting any fraud on the part of the individual, said detection conditioning the identification of the individual by biometric analysis of his face.

DESCRIPTION OF THE FIGURES

Other features, aims and advantages of the present invention will appear from the following detailed description, with respect to the attached figures given by way of non-limiting examples and wherein.

DETAILED DESCRIPTION OF EMBODIMENTS OF THE INVENTION

Figure 1:
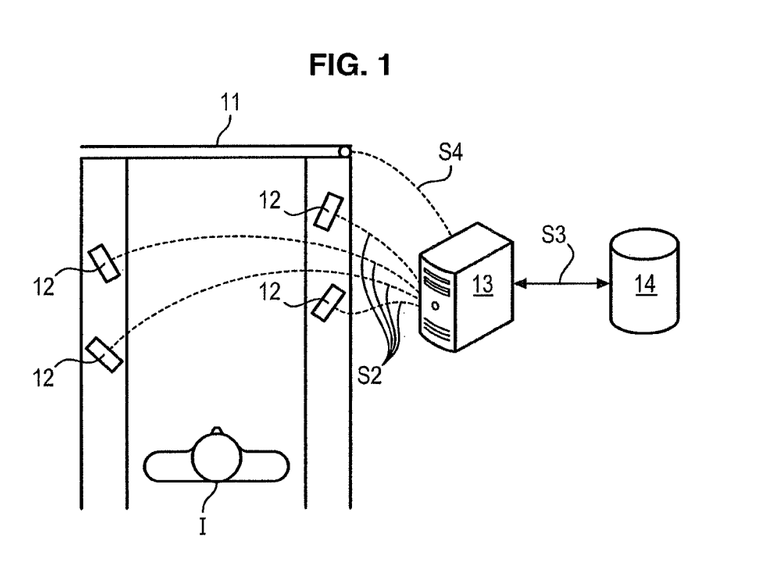
FIG. 1 is an example of an access control system which can execute a method for fraud detection, FIG. 2 schematically illustrates the access control system via biometric recognition.
Figure 2:
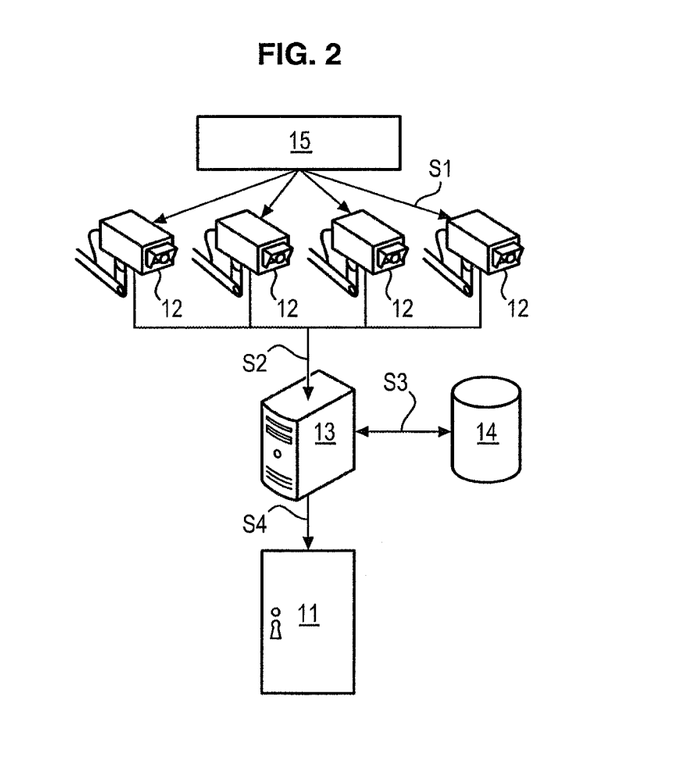

FIGS. 1 and 2 represent an access control system which can be placed at the entry to any place whereof access is controlled, and especially wherein only some people having authorisation can enter. People wanting to access this place must therefore undergo identification, for example by facial recognition, or by recognition of other biometric criteria (iris, digital prints etc.).

In the illustrated case, the system controls opening of a door 11 enabling for example access to a secure zone. It comprises an acquisition system 12, comprising in this case four cameras 12A to 12D which acquire images S2 of an individual standing in front of the system, according to different positions and different viewing angles. A synchronisation module 15 sends to the cameras 12A to 12D a synchronisation signal S1 for launching the acquisitions simultaneously.

The access control system also comprises a calculation platform 13, to which are sent the images S2, and which undertakes treatment of these images for detecting any fraud. It also comprises a database 14 which stores images (images S3) of the faces of individuals authorised to come through the control system, to compare these images to the images acquired and from this comparison make identification of the individual Detection of Fraud When an individual I is near the access control system, one or more acquisition systems 12 captures at least two images of the face presented by the individual during an acquisition step 100.

Figure 3:
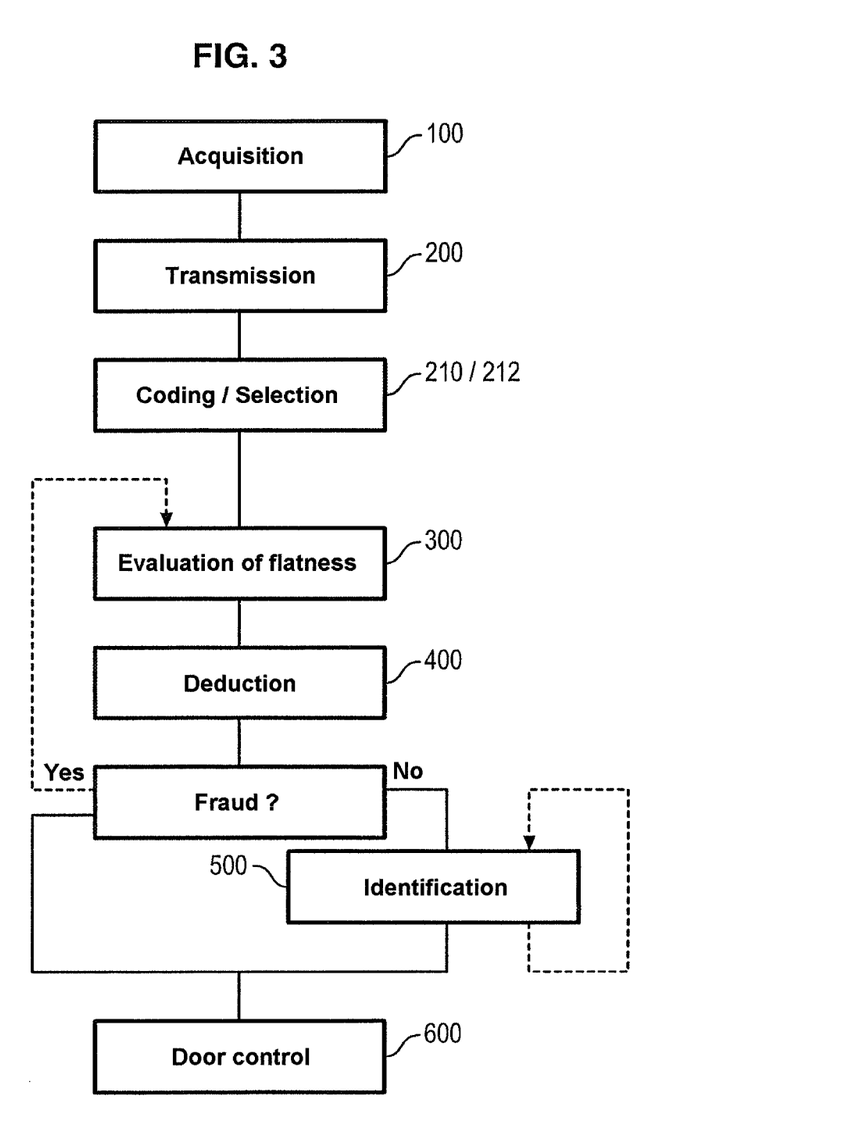
FIG. 3 illustrates the principal steps of the fraud detection method.

The images S2 acquired are then transmitted by the acquisition systems 12 to the calculation platform 13, during a transmission step 200. The images S2 are preferably acquired in digital format and transferred by a conventional connection, wire or not.

The calculation platform 13 if needed then conducts a treatment operation 210 such as coding or compression of images according to a preferred format, or even selection of two images or more.

Then, during two steps 300 and 400 the calculation platform 13 carries out on at least two of the received and selected images fraud detection treatment. The principle of this treatment consists of evaluating the flatness of the face appearing on the images and considering whether there is fraud when this face has no volume and is plane or semi-plane (case of a sheet curved on itself, for example). In fact, if an individual I presents to the cameras an image support in two dimensions representing another face, the flatness of the face detected in this way is greater than the flatness of a face in three dimensions. This helps to differentiate a face illustrated on a flat support (flat attack) and a true face.

In this way, the platform 13 calculates a flatness score (step 300) and compares the resulting flatness score to a preset threshold score (step 400). Different possible methods for calculating a flatness score are described throughout the text in reference to FIGS. 4a to 4d. The threshold score can as such be adjusted as a function of the success rate of detection of fraud as preferred.

On completion of steps 300 and 400, when the calculation platform 13 has detected no fraud, it undertakes treatment in light of identification of the individual I (step 500). To this effect, the platform confronts at least one of the images acquired with a set of images S3 presented in the database. Alternatively, the access control system can confront the images acquired by the cameras 12A to 12D with that of an identity document presented by the individual.

Numerous comparison treatments of images and identification are of course possible. For exemplary embodiments, reference could be made for example to the following publications:

Face recognition: « *Features versus Templates* » (R. Brunelli, T. Poggio, IEEE Transactions on Pattern analysis and feature intelligence, Vol. 15, No. 10, October 1993)

Pose-Robust Recognition of Low-Resolution Face Images, Soma Biswas, Gaurav Aggarwal and Patrick J. Flynn, Department of Computer Science and Engineering, University of Notre Dame, Notre Dame, CVPR 2011.

A Deformation and Lighting-Insensitive Metric for Face Recognition Based on Dense Correspondences, Anne Jorstad, David Jacobs, Alain Trouve, CVPR 2011.

The calculation platform 13 then sends an order S4 for opening or blocking of the door if the individual I identified corresponds respectively to a person authorised to enter or not during a control step 600 of the door. If the individual I does not correspond to a person authorised to enter the calculation platform 13 can repeat the identification step (identified in FIG. 3 by an arrow in dotted lines), or trigger an alarm signal.

However, if the calculation platform 13 has detected fraud, it directly sends a blocking order to the door 11 during step 600.

It can also trigger an alarm signal or again (as indicated by an arrow in dotted lines) proceed with evaluation steps 300 of the flatness of the face for detection of fraud.

Optionally, the coding and selection step 210/212 of images S2 can be conducted by the acquisition system or acquisition systems prior to the image transmission step 200 (alternative not shown in the figures).

Various examples for calculating flatness score possible will now be described.

Methods by Computation of the Variance of Volume

Figure 4A:
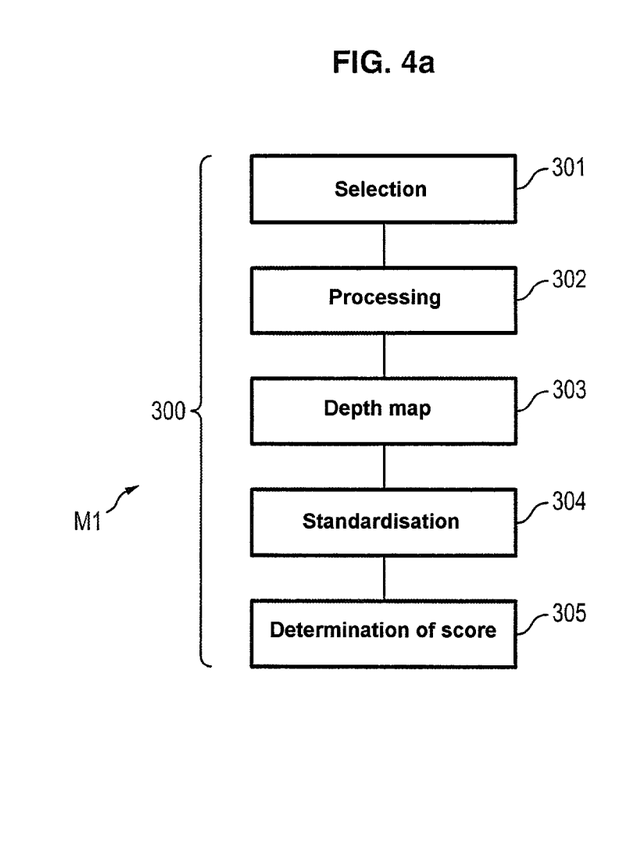
FIGS. 4a to 4d illustrate different embodiments of the evaluation step of the flatness of a face conducted in the fraud detection method.

In reference to FIG. 4a, a first method M1 for calculating flatness conducts a first step 301 consisting of selecting from the images S2 taken by the acquisition systems 12 and transmitted to the calculation platform 13 the images of the face presented by the individual. These images must present a minimum resolution of the order of a centimeter or a semi-centimeter. Also, they are preferably taken at the same moment by two acquisition systems 12 located respectively on the left and right sides of the individual I. It is however preferable for the acquisition systems 12 to undertake acquisition of the face of the individual I with an angle between 0 and 90° relative to the axis of the look.

The calculation platform 13 then carries out preliminary treatment during a step 302 of images selected to proceed with fraud detection. The treatment consists of extracting the face from the selected images, and if needed isolating a single part whereof the flatness is then evaluated.

The pertinent parts to be isolated, such as for example the region of the nose, the mouth, or eyes, can be defined semantically. Algorithms for isolating some parts of the face are described in the following documents:

3D Probabilistic Feature Point Model for Object Detection and Recognition, Sami Romdhani, Thomas Vetter, University of Basel, Computer Science Department, Bernoullistrasse 16, CH—4056 Basel, Switzerland.

Multiple Kernel Learning SVM and Statistical Validation for Facial Landmark Detection, Vincent RAPP, Thibaud SENECHAL, Kevin BAILLY, Lionel PREVOST.

The selection and treatment steps can be reversed such that the calculation platform extracts the faces from the images S2 prior to selecting the pair of faces to be processed, and optionally the part of the face whereof the flatness is measured.

Once the images are selected, the platform 13 calculates, in a step 303, a depth map of the part of the face selected.

Preferably, this is part of the face centred on the width on the nose and extending between the ears, and whereof a third in height is located above the nose, with the remaining two thirds located under the nose of the individual.

In fact, it is the zone of the face generally showing the least flatness, that is, it is the zone of the face showing the most reliefs, in density and in absolute value.

Alternatively, the part of the face can be a block centred on the nose of the individual I.

For making the depth map of the part of the face the calculation platform 13 recreates the part of the face in question according to any known reconstitution method in three dimensions from stereovision.

For example it registers points common to the two images, and from this registering it puts in place a metric which measures the disparity between two corresponding points. This disparity is representative of the volume of the part of the face studied.

Several methods for registering can be used. According to a first « hollow » registration method only some points of the images are selected and registered. As per this method, the calculation platform 13 can for example employ the following algorithm:

Automatic search of points of interest on the two images, based for example on information ob gradient or colour, Calculation of descriptors associated with each point of interest;

Set-up of a metric $M(x,y)$, and search for couples of points $(i,j)$ between the two images whereof the descriptors $(d(i), d(j))$ present good scores $M(d(i), d(j))$—for example whereof the score is greater than a predetermined threshold, defined statistically from a learning base. A point of a first image can be associated only with a point at a maximum of the second image. However, a point of the first image cannot belong to a couple if no point of the second image can validate a score $M(d(i), d(j))$.

Determination of the metric is such that calculating these scores is representative of the distance between the points, producing an estimation of the volume of the depth map.

Alternatively, the calculation platform can employ a method for dense registration by using for example the following algorithm:

associated with each point i of coordinates $(x1,y1)$ of the first image is a point j of coordinates $(x2, y2)$ in the second image.

The depth map is then calculated by determining the distances (for example using the Euclidian distance) for each couple of points $(i,j)$.

Also, for more details on reconstitution methods in three dimensions, reference could be made to the publication « Multi-View Stereo Reconstruction and Scene Flow, Estimation with a Global Image-Based Matching Score », (Pons, Keriven and Faugeras, Kluwer Academic Publishers, 2005).

Next, during a following step 304, the calculation platform 13 standardises the depth map so that it is independent of the angle of the face of the individual on the images relative to the acquisition system 12. This step is optional, however.

Finally, during a step 305, the calculation platform sets up a score P1 representative of the flatness of the part of the face studied by calculating the variance of the volume of the face relative to a median plane of the latter. To do this, a median plane of the depth map represented in three-dimensional space is determined, and the variance of each of the points of the map is calculated by measuring the distance in three dimensions, relative to this median plane. The flatness score P1 is the calculated variance.

Variant on a Couple of Volumes

Figure 4B:
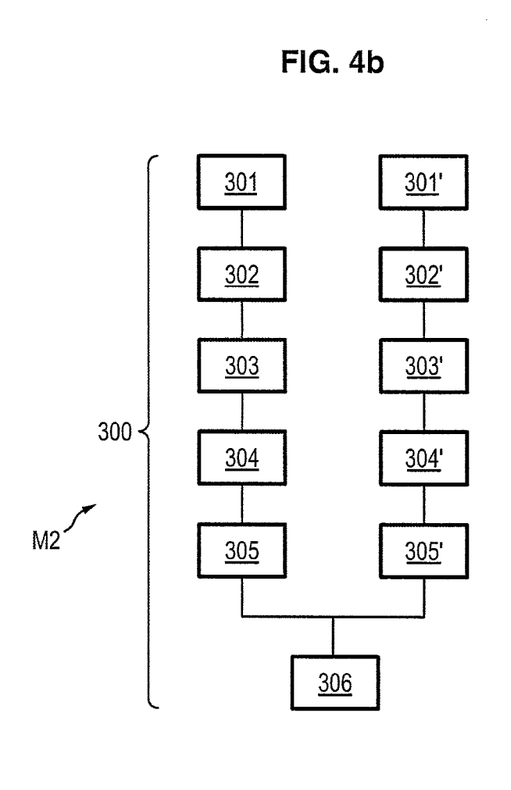

A second method of facial recognition M2, the steps of which are illustrated in FIG. 4b, reprises the principal steps of the first M1.

It consists of applying:

first, in steps 301 to 305 of the method M1 the complete face of the individual or part of the latter, for example on part of the face centred in width on the nose and extending between the ears, and whereof one third in height is located above the nose, and the remaining two thirds are located beneath the nose of the individual, to obtain a first score P1, and also, steps 301' to 305' of the method M1 on a block centred on part of the face, for example the nose of the person, to obtain a second score P2. In particular, step 301' for selection of the faces in the images is conducted on the same images S2 as for step 301, and also it consists of isolating the block centred on the nose of the person, according to the methods described above.

Finally, during a step 306 a score P3 is determined from the scores P1 and P2. For example, the score P3 can be a linear combination of P1 and P2 of type P3=P1+λP2. The score P3 takes into account both the volume and the overall flatness of the face, given by the score P1, and also the additional volume and protuberance of the nose, given by the score P2.

This method can also be used by isolating several parts of the face, and by calculating for each of these parts scores P2', P2'', P2''' etc.

In this case the score P3 determined during step 306 is calculated from the scores P1, P2', P2'', P2''', for example by means of a linear combination of these scores; P3=κP1+λP2'+μP2''+νP2'''.

The factors κ, λ, μ, and ν are as such predetermined during tests conducted on a learning base to optimise results linked to use of the score.

This second method M2 is particularly pertinent for combating « semi-plane » attacks.

In fact, in the case of « semi-plane » attack, a person can carry a photo curved on its face, such that the volume delimited by the photo can exhibit a volume similar to that of a face.

But, curving a photograph fails to copy the volume of the nose of a person, since the latter always forms a protuberance relative to the rest of the face. This method of evaluation of the flatness, comprising general evaluation of the flatness of the face, plus the volume represented by the nose of a person, therefore resists both plane and semi-plane attacks.

Method by Comparison of Points of Interest

Figure 4C:
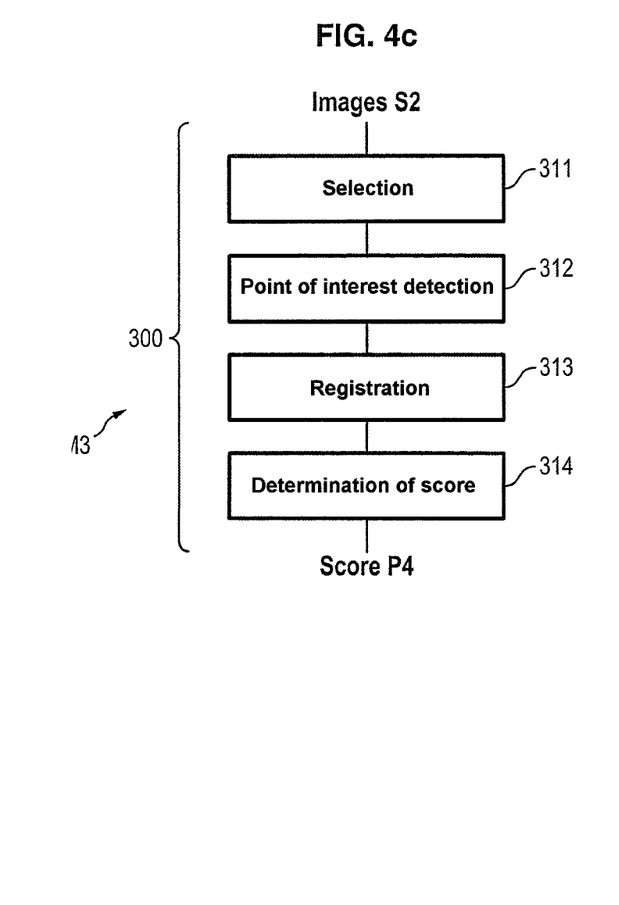

FIG. 4c illustrates a third evaluation method M3 of the flatness of a face.

This method M3 requires use of two photographs preferably taken respectively to the left and right of the face of the individual I, and at the same time. Alternatively, if the access control system is in an airlock at the entry to secure premises, through which the individual I is moving, the same acquisition system can take two images at two different instants, the distance of the individual and the angle of vision of the acquisition system between the two images being different.

During a first step 311, the calculation platform 13, to which the two images S2 were transferred, selects the images on which treatment is carried out, and extracts from these images the face of the individual. This step is similar to step 301 mentioned above.

Then the calculation platform 13 determines during a step 312, on each of the images, points of interests of the faces, typically by means of robust descriptors on the images.

For example, the points of interest are determined by calculating descriptors of type SIFT (scale-invariant feature transform), that is, in invariant descriptors relative to scale and relative to image. Other methods for detection of points of interest are described in the publication « 3D Probabilistic Feature Point Model for Object Detection and Recognition » (Sami Romdhani, Thomas Vetter).

Because of the invariant descriptors relative to scale, corresponding points of interests can be found on two different images.

Yet, if the images are taken respectively to left and right of the individual I, due to the relief of the face some points of interest will be visible only on one of the two images: this is the case, as a function of the angle of vision, for some parts of eyes, mouth, or some characteristic points of the skin, such as moles.

However, if the individual is carrying a photograph, even curved, no relief masks the points of interest of the face illustrated in the photograph.

This phenomenon is used, on non-frontal images, for evaluating the flatness of the face whereof the image is taken: during a comparison step 313, the two images are compared to determine which are the points of interest common to the two and which are the points of interest appearing only on one of the two images. For this step, the calculation platform can execute one or other of the dense registration algorithms, or hollow ones as described above.

Then, during a step 314, the calculation platform 12 determines a score P4, representative of the flatness of the face featured on the image, from the number of common points of interest.

This score P4 is calculated by dividing the number of points of interest common to the two images by a number which can be the minimum, maximum or average number of points of interest between the two images.

The less the face featured on the image has relief, the greater the score P4. Consequently, repeating this method a sufficient number of times on images from a known database determines a score P4 forming a threshold above which fraud is detected with certainty.

Method Via Transformation and Superposition of Images

Figure 4D:
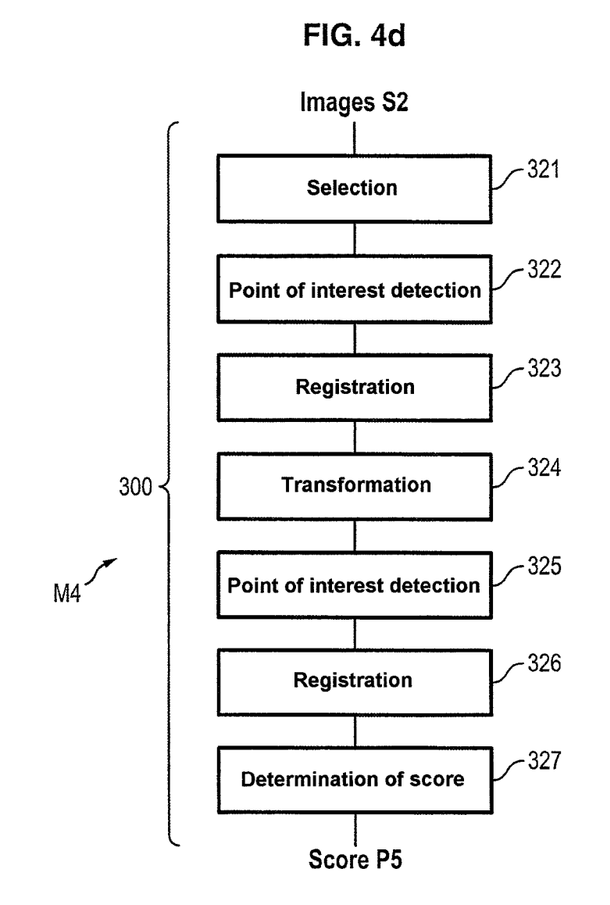

FIG. 4d illustrates a fourth method M4 for evaluating the flatness of a face for detecting fraud.

To execute this method M4, images S2 are preferably used which are taken either front on relative to the face of the individual, or respectively to left and right of the face of the individual, with symmetrical viewing angles.

During a first step 321, the platform 13 makes a selection of faces on the images S2 transmitted by the acquisition systems 12, similarly as for step 201.

Then, during a step 322, the platform 13 determines points of interest in the two images, in the same way as during step 312 described previously.

The calculation platform 13 then registers the points of interest identified during a step 323 similar to step 313, and on one of the two images S2, during a step 324, this occurs before transformation of refined or quadratic type for example is carried out, with parameters determined by classic methods of linear algebra, from the couples of points registered during step 323.

The parameters are calculated to cancel out the differences between the images generated by the differences of vision. In this case, the image transformed is closer to the image to which it is compared in the case of a flat image than that of a volume in three dimensions, since the information featured on the two images are different in the latter case.

During the following step 325, the calculation platform 12 determines points of interest on the two images, whereof one has previously been transformed, according to the same method as during step 322 described previously.

Finally, during the following step 326, the platform registers the points of interest of the two images, and determines a disparity measurement during a step 327 between these points of interest.

This measurement represents a flatness score P5.

In fact, in the case of a flat image the two images match after transformation, and disparities between the points of interest are much more reduced than those of images originating from a volume.

Finally, it is also possible to implement the different methods to obtain the respective scores, and from these scores deduce a final flatness score P6. This score can be a linear combination or an average of the flatness scores P1 to P5, making the final result more robust.

The invention claimed is:

1. A method of fraud detection for an access control system via biometric recognition, comprising the steps:
   taking at least two images (S2) of a face presented to the access control system by an individual (I) according to at least two positions of the individual in front of the access control system, or two angles of vision of the individual,
   extracting the face from each of the images,
   processing the at least two images to determine a score representative of a flatness of the face appearing on the images, and
   as a function of the flatness score, detecting any fraud on the part of the individual, said detection conditioning the use of identification treatment of the individual by the access control system,
wherein the step for determination of a score representative of the flatness of the face comprises the steps:
   creating a depth map of the face of the individual (I), estimating a median plane of the map of the face, and calculating the variance of the points of the map of the face relative to said median plane of the map of the face,
   isolating from the images a block of the face centred on a nose of the individual, creating a depth map of said block, estimating a median plane of the map of said block, and calculating the variance of the points of the map of said block relative to said median plane of the map of said block, and
   obtaining a flatness score of the face by linear combination of the variances of the points of the depth maps relative to the respective median planes.

2. The method according to claim 1, also comprising a standardisation step of the depth map of the face so that the depth map of the face is independent of the angles of vision of the images of the face of the individual.

3. An access control system via biometric recognition, comprising:
   at least one acquisition systems (12) adapted to capture at least two images of a face presented by an individual (I) according to at least two positions or viewing angles of the individual relative to the at least one acquisition system (12), and
   a calculation platform (13) to which are sent the at least two images (S2) by the at least one acquisition system (12), the calculation platform (13) being adapted to process the at least two images to determine a score representative of a flatness of the face appearing on the images, and to
      isolate from the images a block of the face centred on a nose of the individual,
      create a depth map of the face of the individual (I) and create a depth map of the block centred on the nose of the individual,
      estimate, for each map, a median plane of said map,
      calculate the variance of the points of each map relative to a median plane of said map, and
      calculate a flatness score of the face by linear combination of the variances of the points of the depth maps relative to the respective median planes, and
   from the score representative of the flatness of the face detect any fraud on the part of the individual, said detection conditioning the identification of the individual by biometric analysis of the face of the individual.

4. The access control system according to claim 3, said system being arranged upstream of a regulated access door (11), and the calculation platform (13) being adapted to control the opening of the door, and wherein fraud detection and identification of the individual condition opening of the door (11).

* * * * *

UNITED STATES PATENT AND TRADEMARK OFFICE
CERTIFICATE OF CORRECTION

PATENT NO. : 8,933,783 B2  
APPLICATION NO. : 14/342358  
DATED : January 13, 2015  
INVENTOR(S) : Sebastien Brangoulo and Thomas Fedusac Page 1 of 1

It is certified that error appears in the above-identified patent and that said Letters Patent is hereby corrected as shown below:

On the Title Page, in Item [30] under Foreign Application Priority Data, at line 1, please insert --January 9, 2011 (FR) 1157764--.

Signed and Sealed this
Twenty-ninth Day of September, 2015

Michelle K. Lee
*Director of the United States Patent and Trademark Office*